(12) United States Patent
Ghim

(10) Patent No.: US 6,761,448 B2
(45) Date of Patent: Jul. 13, 2004

(54) EYEGLASS RETAINER WITH RETAINER STRAP AND INTERLOCKING RETAINER DEVICES

(76) Inventor: Vincent J. Ghim, 3395 N. Dixie Hwy. Bay #7, Boca Raton, FL (US) 33431

( * ) Notice: Subject to any disclaimer, the term of this patent is extended or adjusted under 35 U.S.C. 154(b) by 0 days.

(21) Appl. No.: 10/277,193

(22) Filed: Oct. 21, 2002

(65) Prior Publication Data

US 2003/0133072 A1 Jul. 17, 2003

Related U.S. Application Data

(60) Provisional application No. 60/343,626, filed on Oct. 22, 2001.

(51) Int. Cl.[7] ................................................. G02C 1/00

(52) U.S. Cl. .......................... 351/43; 351/156; 351/157

(58) Field of Search ................................. 351/156, 157, 351/158, 41, 43; 24/3.3

(56) References Cited

U.S. PATENT DOCUMENTS 5,087,118 A * 2/1992 Gill ............................ 351/156

* cited by examiner

Primary Examiner—Hung X. Dang
(74) Attorney, Agent, or Firm—John C. Smith

(57) ABSTRACT

A multifunctional eyeglass retainer which can be secured to a pair of eyeglasses such that the eyeglasses can be held in either an open or a closed position. In addition, the eyeglass retainer can also be fabricated such that it has sufficient buoyancy to remain floating to even if the eyeglass retainer becomes partially disengaged from the eyeglasses and the eyeglasses fall into water while the wearer is swimming. The eyeglass retainer has connectors at both ends which connect to the temples of a pair of eyeglasses. When connected in this manner, the eyeglasses can be carried in an open configuration. Likewise, the eyeglass retainer can be secured to a pair of eyeglasses by securing the opposing ends of the eyeglass retainer together and using a loop formed by the eyeglass retainer to retain the eyeglasses in a closed configuration. The device further includes an optional buoyancy element which will prevent the glasses from sinking should one end of the eyeglass retainer become detached from the eyeglasses when the wearer is in water.

10 Claims, 13 Drawing Sheets

EYEGLASS RETAINER WITH RETAINER STRAP AND INTERLOCKING RETAINER DEVICES

CROSS-REFERENCE TO RELATED APPLICATIONS

This application is a non-provisional application which claims the benefit of the commonly owned copending provisional application entitled "EYEGLASS RETAINER", filed Oct. 22, 2001, bearing U.S. Ser. No. 60/343,626 and naming Vincent J. Ghim, the named inventor herein, as sole inventor, the contents of which is specifically incorporated by reference herein in its entirety.

BACKGROUND OF THE INVENTION

1. Technical Field

The present invention relates to eyeglass securing devices. In particular, it relates to a necklace device for securely retaining a pair of eyeglasses around the neck of a wearer in either an open or a closed configuration.

2. Background

A large portion of the population carries eyeglasses with them for use when needed. Unfortunately, eyeglasses are easily lost or misplaced. As a result, retaining devices have been fabricated to allow individuals to secure the eyeglasses to themselves such that they do not have to worry about losing them. Typically these devices secured to the ends of eyeglasses such that their suspended from the neck of the wearer an open configuration. It would be desirable to have a method of retaining glasses such that they could not only be secured to a wearer in the open configuration, but also secured such that they are held in a closed configuration to avoid inadvertent damage to the glasses.

Another problem associated with prior art retaining devices is that they do little to prevent loss of eyeglasses when individuals wear their glasses into water, such as one swimming. Many glasses are heavy enough to sink if dropped which makes them difficult if not impossible to retrieve. This can commonly happened when a prior art eyeglass retainer becomes disconnected from user who was wearing eyeglasses in water. When the eyeglasses fall from the user, the typically sink to the bottom. The would be desirable to have a method that would ensure that glasses will not sink when dropped into water.

While prior art has provided devices for holding eyeglasses and open configuration, it has not provided a single device which is capable of holding eyeglasses in an open configuration, holding eyeglasses and closed configuration, and further preventing loss of the eyeglasses in the event that the eyeglass holder disconnects and the eyeglasses inadvertently fall into water.

SUMMARY OF THE INVENTION

The present invention provides a multifunction device which can secure both ends of a neckless to the temples of a pair of eyeglasses such that the eyeglasses can be carried in an open configuration, or secure the ends of the necklace together and use a loop retainer to retain the eyeglasses in a closed configuration.

The device includes a number of optional securing mechanisms to attach to the ends of the arms of the glasses the glasses are kept in an open configuration. Likewise, the device includes a unique loop structure to secure to the arms of the glasses when they are kept in a closed configuration.

The device further includes an optional buoyancy element which will prevent the glasses from sinking should retaining device become dislodged when the wearer is in water.

BRIEF DESCRIPTION OF TILE DRAWINGS

DESCRIPTION OF THE PREFERRED EMBODIMENT

Prior to a detailed discussion of the figures, a general overview of the system will be presented. The invention provides a single device that allows an individual who wears eyeglasses to secure the eyeglasses in a variety of ways. The device includes an eyeglass retaining strap in which each end of the eyeglass retaining strap can be secured to a temple of a pair of eyeglasses. For the purposes of this discussion, term "temple" is intended to mean that portion of the arm on a pair of eyeglasses which is distal from the lens. Once the ends of the eyeglass retaining strap are secured to the eyeglass arms, the eyeglass retaining strap can be placed around the neck of the wearer such that the eyeglasses rest on the chest of the wearer in the open configuration when the wearer does not want to wear the eyeglasses.

However, in addition to this method of use, the ends of the eyeglass retaining strap can be secured together to form a loop. An additional loop forming device is then used to create a snug loop in the eyeglass retaining strap which secures to an arm of a pair of eyeglasses such that the eyeglasses can be suspended in the closed position on the wearer's chest when the wearer does not want to wear the eyeglasses. When the loop is attached to the arm of a pair of eyeglasses, it is preferably attached at the proximal end of the eyeglass arm, near the hinge, which is attached to the eyeglass lens assembly. As a result, the device can suspend a pair of eyeglasses by attachment to the temples of the eyeglasses, and it can also suspend a pair of eyeglasses in the closed position by attachment to an arm of the eyeglasses. We turn now to a more detailed discussion of the figures.

Figure 1A:
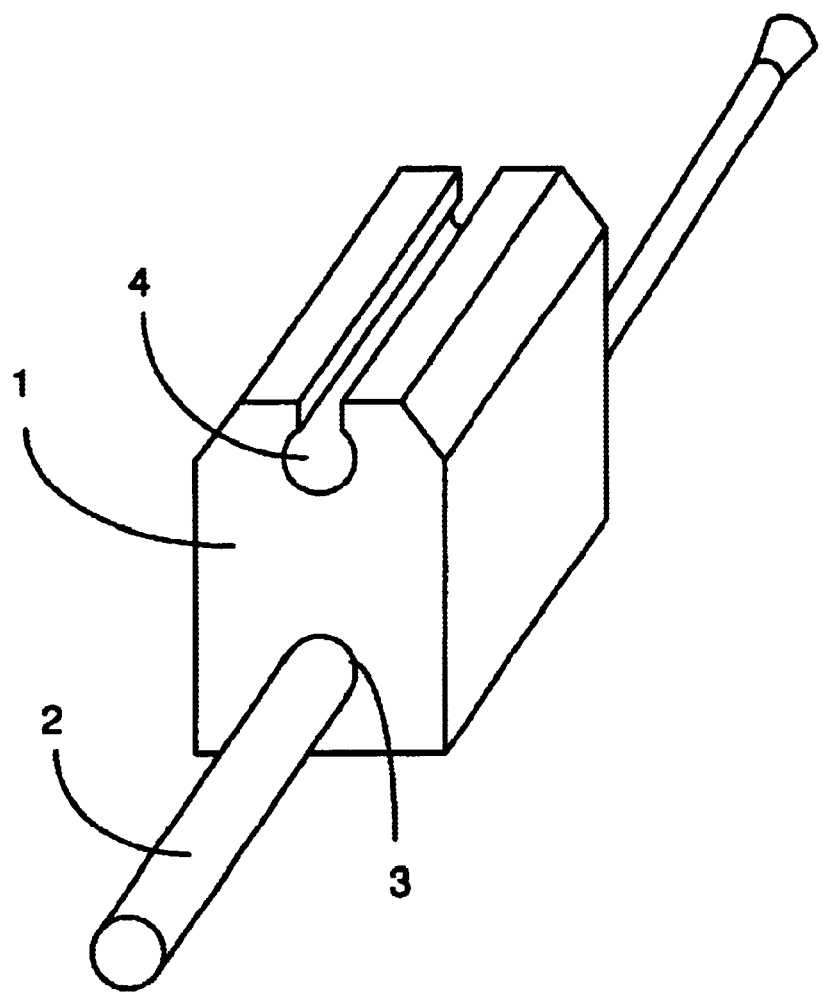
FIG. 1A is a diagram that illustrates a preferred embodiment of a retaining device for securing both ends of an eyeglass retaining strap.

In FIG. 1A, a preferred embodiment of a retaining device 1 for securing both ends of an eyeglass retaining strap 2 is shown. In the preferred embodiment, the eyeglass retaining strap 2 is made from nylon string. However, those skilled in the art will recognize that any suitable material can be used to fabricate the retaining strap 2. The retaining device 1 is shown with a first aperture 3 which is secured to the eyeglass retaining strap 2 such that it is not removable. A second aperture 4 is also shown which allows the other end of the retaining strap 2 to be attached to the retaining device 1. The first and second apertures 3–4 are sized to snugly and slidably attach to the eyeglass retaining strap 2. Further, an advantage of having the first aperture 3 structured such that the eyeglass retaining strap 2 is permanently attached to the retaining device 1 is that the wearer does not have to worry about inadvertently disconnecting the two components and then mislaying one or the other.

Figure 1B:
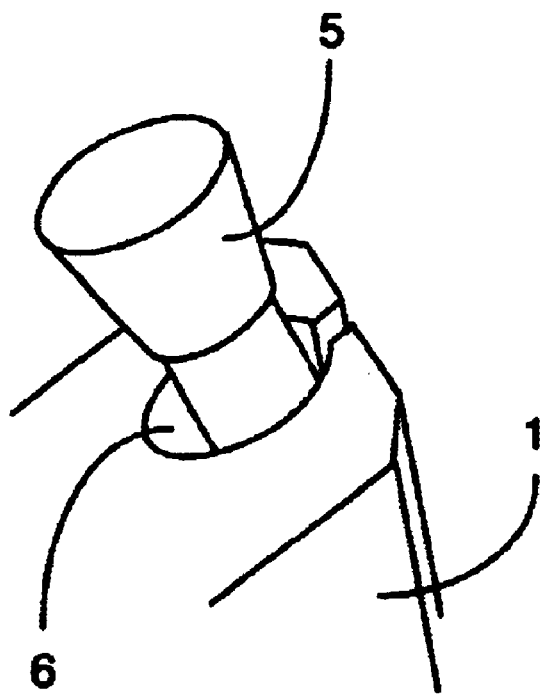
FIG. 1B is a close-up view of the end of the retaining strap of the embodiment of FIG. 1A inserted into the retaining device of FIG. 1A.

In FIG. 1B, a close-up view of a preferred embodiment of the end of the retaining strap 2 is illustrated. In this embodiment, the tip of the retaining strap 2 has a conical tip 5 which fits into a corresponding conical aperture 6 in the retaining device 1. This allows the retaining strap 2 to be locked in place in the retaining device 1 by pulling the retaining strap 2 such that the conical tip 5 is snugly fit within the conical aperture 6. Preferably, the conical tip S and the retaining device 1 are made from frictional material, such as rubber, which will enhance the ability to lock the retaining strap 2 to the retaining device 1.

The wearer forms a necklace by having a first end of the retaining strap 2 attached to the first aperture 3, and then attaching the other end of the retaining strap 2 to the second aperture 4.

Figure 1C:
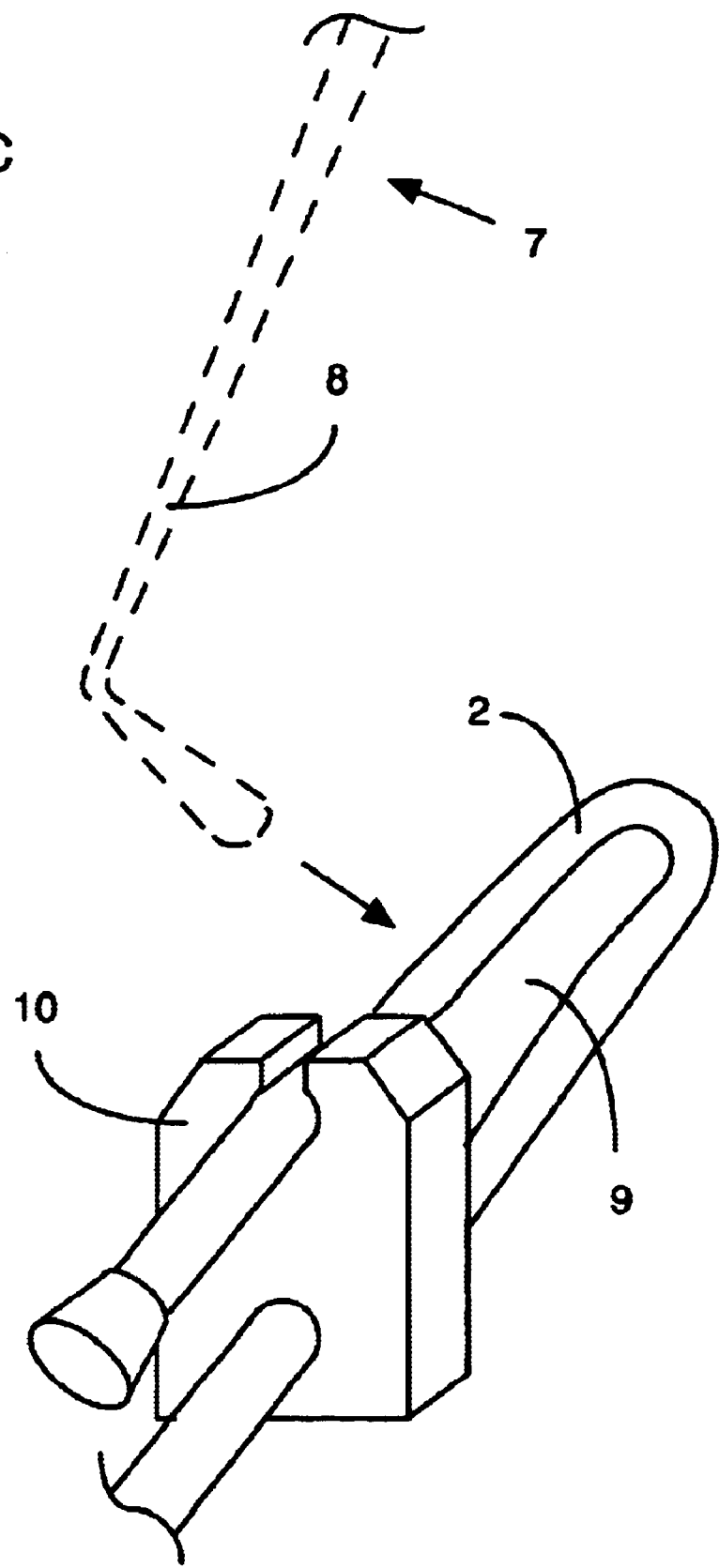
FIG. 1C illustrates the arm of a pair of eyeglasses being inserted into a retention loop formed to allow the eyeglass retaining strap to be secured to the proximal end of an eyeglass arm.

FIG. 1C illustrates the arm 8 of a pair of eyeglasses 7 being inserted into a retention loop 9 formed to allow the eyeglass retaining strap 2 to be secured to the proximal end of an eyeglass arm. The retention loop 9 is formed when a loop retainer 10 is attached to the retaining strap 2. In the preferred embodiment, the loop retainer 10 is attached to the retaining strap 2 in the same manner that the retaining device 1 was attached. For ease of illustration, the retaining device 1 is not shown in this figure. Once the arm 8 of the eyeglasses 7 is inserted through the retention loop 9, the loop retainer 10 is slid toward the arm 8 thereby reducing the loop in size and tightening it around arm 8. Once this is accomplished, the arms 8 of the eyeglasses 7 can be folded and eyeglasses can be suspended in the folded position from the eyeglass retaining strap 2 which is wrapped around the neck of the wearer in the form of necklace.

As was the case above, in regard to the retaining device 1, the loop retainer 10 can be fabricated from any suitable material. In addition, those skilled in the art will recognize that the loop retainer 10 can in fact be fabricated such that it is identical to the retaining device 1. For aesthetic reasons, the loop retainer 10 and the retaining device 1 can have entirely different ornamental appearances and can be fabricated from entirely different materials. For example, when the device is worn by the someone with long hair, the retaining device 1 would typically be hidden behind the hair on the back of the neck which means that a simple ornamental design would be used. On the other hand, the loop retainer 10 would typically be visible on the chest of the wearer. Because of this, a much more ornamental look might be desired. In fact, the loop retainer 10 may even be fabricated as an item of jewelry.

Figure 2A:
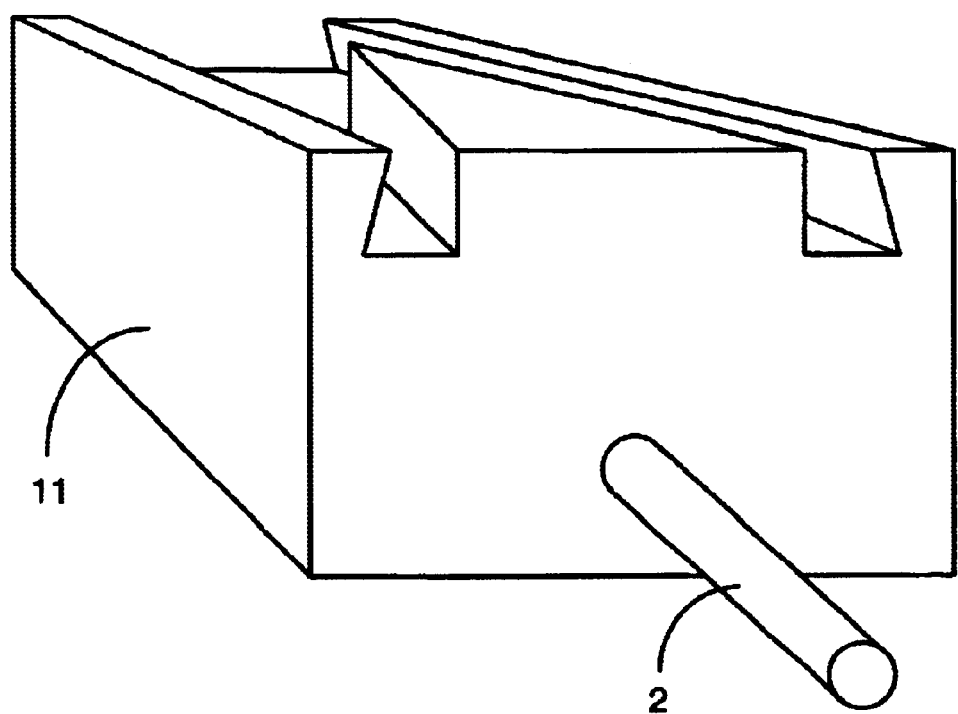
FIG. 2A illustrates an alternative preferred embodiment of a first portion of a preferred embodiment of the retaining device.

FIG. 2A illustrates an alternative preferred embodiment of a first portion of the retaining device. In this embodiment, the first end of the eyeglass retaining strap 2 is secured to a male retaining device 11. The male retaining device 11 is designed to be secured to a corresponding female retaining device 12 (shown in FIG. 213) which is attached to the other end of the eyeglass retaining strap 2.

Figure 2B:
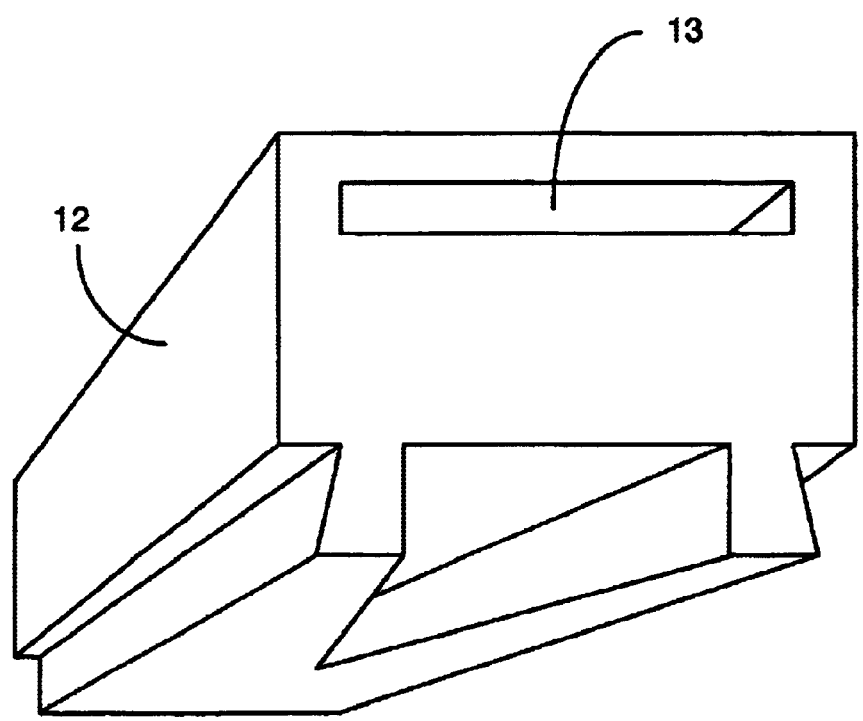
FIG. 2B illustrates an alternative preferred embodiment of a second portion of the retaining device which interlocks with the first portion of the retaining device shown in FIG. 2A.

FIG. 2B illustrates an alternative preferred embodiment of a second portion of the retaining device which interlocks with the male retaining device 11 shown in FIG. 2B. In this embodiment, the second end of the retaining strap 2 is secured to a female retaining device 12. The male retaining device 11 and the female retaining device 12 are designed to be slidably attachable to one another. Preferably, the material they are fabricated from has sufficient friction to insure that they lock in place when put together. This figure illustrates the appearance of the female retaining device 12 end which is distal from the eyeglass retaining strap 2. This view illustrates a temple aperture 13 which is designed to snugly and slidably except an eyeglass temple. The male retaining device 11 and the female retaining device 12 both have a temple aperture 13 to allow opposite ends of the retaining strap 2 to be secured to the temples of opposing arms 8 of the eyeglasses 7. The material used to fabricate the male and female retaining devices 11–12 should be of a material, such as rubber, which is suitable to provide friction to retain the temples of the eyeglass arms 8.

This structure accomplishes two goals: first, the male and female retaining devices 11–12 can be attached to one another such that they allow the device to form a necklace that can be worn about the neck. When configured in this manner, a loop retainer 10 can be used to form a retention loop 9 which secures to an arm 8 of the eyeglasses 7. This allows the eyeglasses 7 to be secured to the wearer in the closed position. Alternatively, the male and female retaining devices 11–12 can be separated and attached to the temples of arms 8 of a pair of eyeglasses 7 such that the eyeglasses 7 can be secured to the wearer in the open position.

Figure 2C:
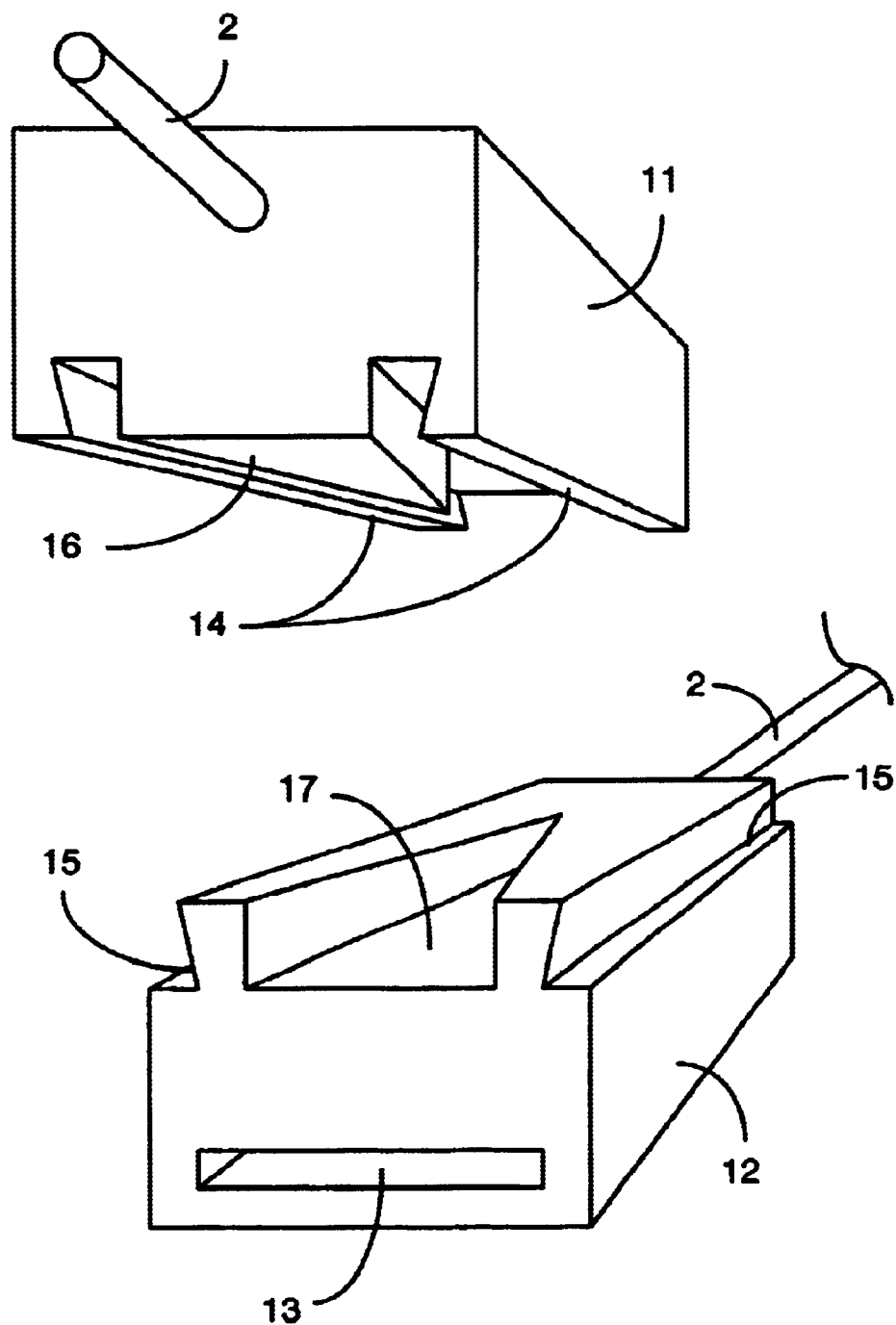
FIG. 2C illustrates the first portion and the second portion of the retaining device shown in FIGS. 2A–B prior to being secured together.

In FIG. 2C, male and female retaining devices 11–12 are shown prior to being secured together. The external side walls 14 of the male retaining device 11 snap onto the inner walls 15 of the female retaining device 12 and the male fitting 16 of the male retaining device 11 joins with the female fitting 17 to secure the retaining strap 2 in the necklace configuration. While the configuration of the male and female retaining devices 11–12 presented herein provides an effective method of securing the retaining strap 2, those skilled in the art will recognize that the other structures illustrated herein can also be used to accomplish this goal.

Figure 3A:
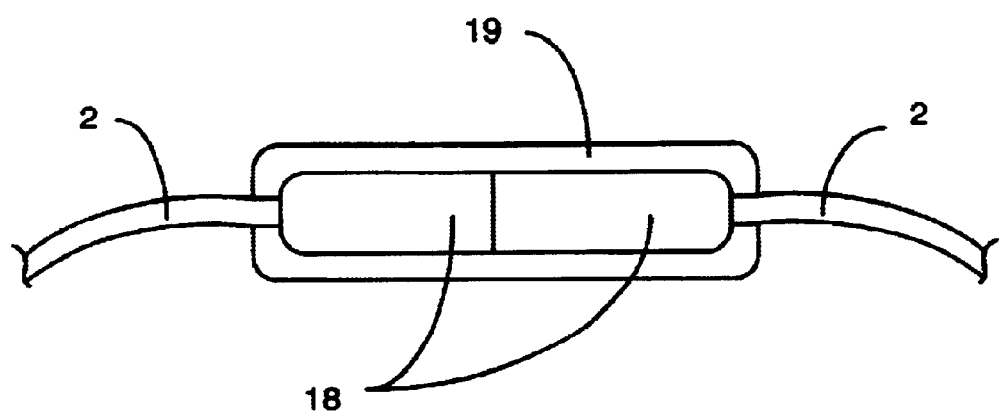
FIG. 3A illustrates another alternative preferred embodiment of the retaining device.

FIG. 3A illustrates another alternative preferred embodiment of a retaining strap 2 with a flexible temple holder 18 attached to either end. The flexible temple holders 18 are inserted into a flexible holder wrapper 19 to secure them together when the retaining strap 2 is configured in the form of a necklace. Those skilled in the art will recognize that any suitable material may be used to fabricate the flexible temple holders 18.

Figure 3B:
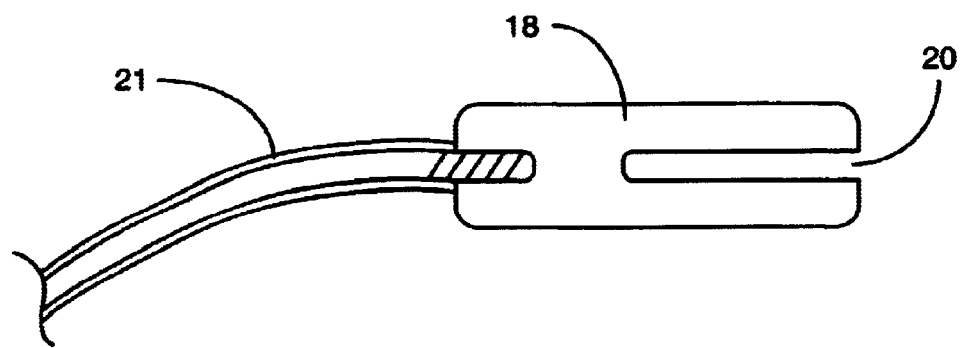
FIG. 3B illustrates an alternative preferred embodiment of the retaining device of FIG. 3A.

FIG. 3B illustrates a detailed view of a flexible temple holder 18 which has a temple aperture 20 for receiving the temple of an eyeglass arm 8. This embodiment differs slightly from the embodiment of FIG. 3A in that a rubber tube 21 is used to secure the retaining strap 2 to the flexible temple holder 18.

Figure 4:
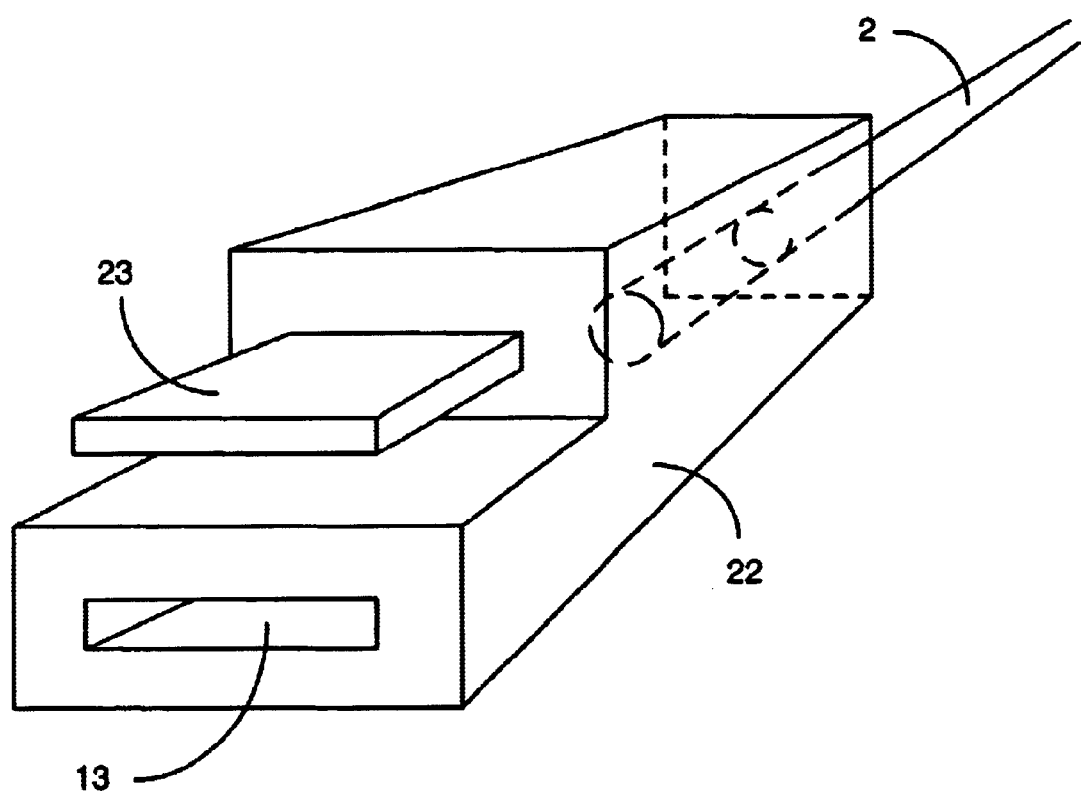
FIG. 4 illustrates yet another alternative preferred embodiment of a retaining device which uses identical male/female connectors.

FIG. 4 illustrates yet another alternative preferred embodiment of a retaining device which uses identical male/female connectors 22. In this embodiment, a locking key 23 is inserted into the temple aperture 13 on the opposing male/female connector 22 on the retaining strap 2. In this manner, the locking key 23 secures the opposing male/female connectors 22 together via a pressure fit. As was the case with previous embodiments, the temples of the eyeglass arms 8 can be inserted into the temple apertures 13 so that the eyeglasses 7 can be carried in the open position, or the opposing male/female connectors 22 can be joined and used in connection with a loop retainer 10 to secure the eyeglasses 7 to the retaining strap 2 in the closed position.

Figure 5A:
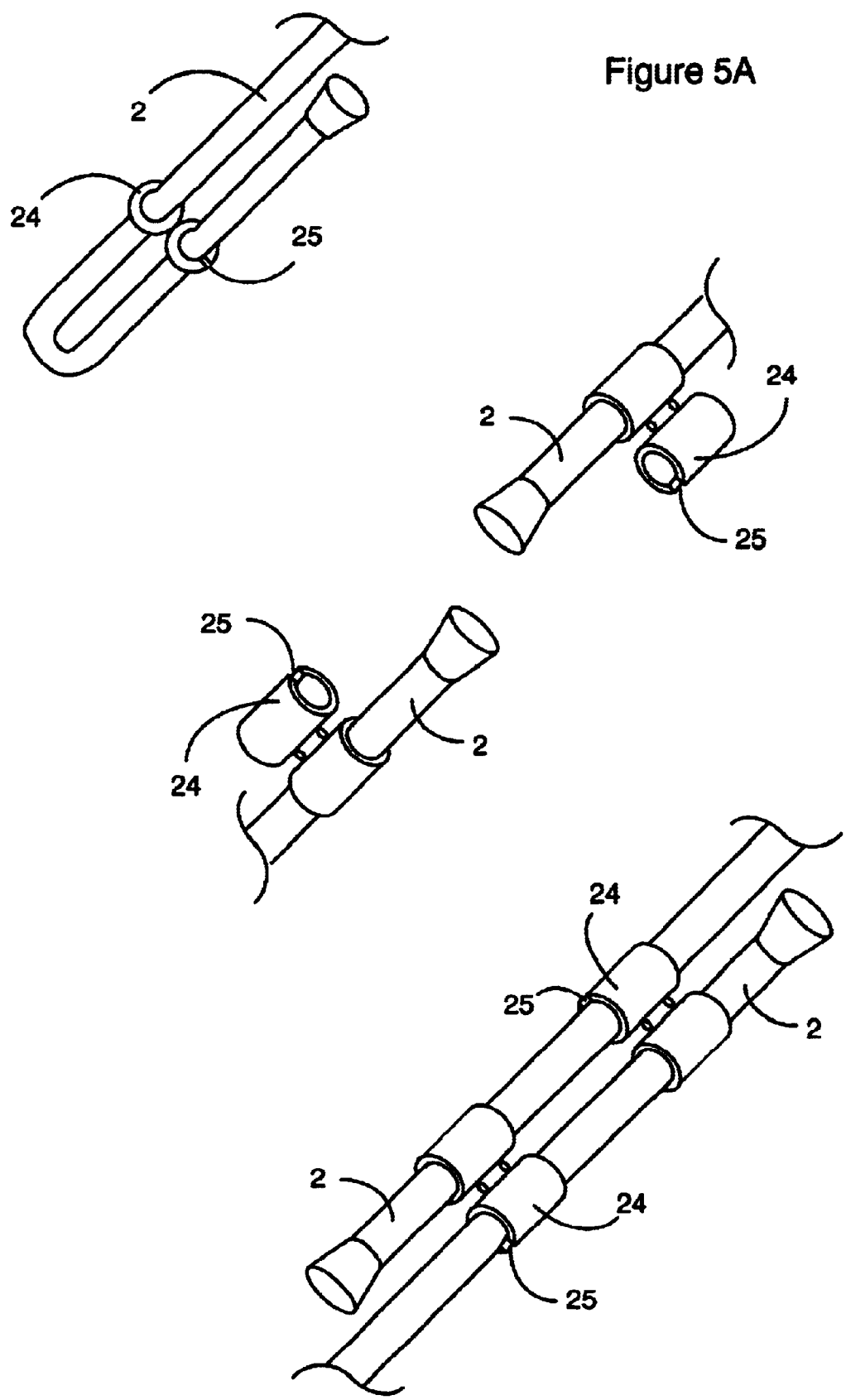
FIG. 5A illustrates a preferred embodiment of securing rings used to form a loop to secure to an arm on a pair of eyeglasses.

FIG. 5A illustrates a preferred embodiment of securing rings 24 used to form a loop 9 to secure an arm 8 of a pair of eyeglasses 7. The securing rings 24 will preferably have at least one ring with a slot 25 for snapping onto a retaining strap 2. The securing rings 24 replace the loop retainer 10.

Figure 5B:
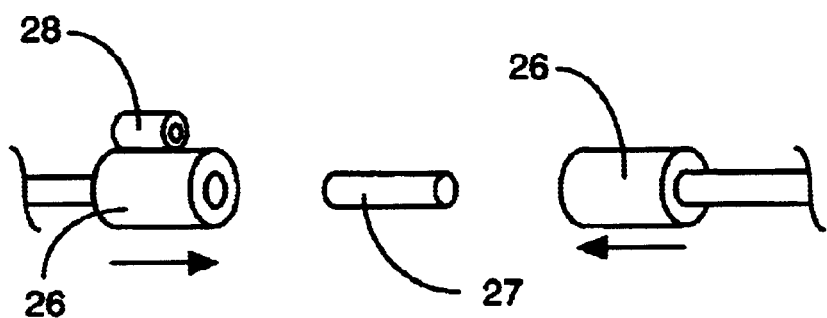
FIG. 5B illustrates another alternative preferred embodiment of a retaining device which uses female connectors on both ends of the eyeglass retaining strap that attached to a double male connector.

FIG. 5B illustrates another alternative preferred embodiment which uses opposing female connectors 26 on both ends of the eyeglass retaining strap 2 which are attached to a double male connector 27. When the device is configured in the form of a necklace, the double male connector 27 is inserted into both female connectors 26 to form the necklace. In the event that the wearer wishes to configure the device such that eyeglasses 7 can be held in the open position, then the double male connector 27 is inserted into storage slot 28 and the female connectors 26 are attached to the temples of the wearer's eyeglasses 7. Of course, the female connectors 26 must be configured such that they can be removably attached to the temples of the wearer's eyeglasses 7. As was the case with the previous embodiments, this embodiment also allows the wearer to carry the wearer's eyeglasses 7 in either the open or closed positions. Of course, some form of loop retainer 10 is required to allow both configurations to be used.

It is also possible to fabricate this embodiment such that one female connector 26 has a larger diameter to allow male/female mating. Of course, the material used to construct the female connectors 22 in this embodiment must be sufficient to allow both female connectors 22 to secure themselves to the temples of a pair of eyeglasses 7.

Figure 5C:
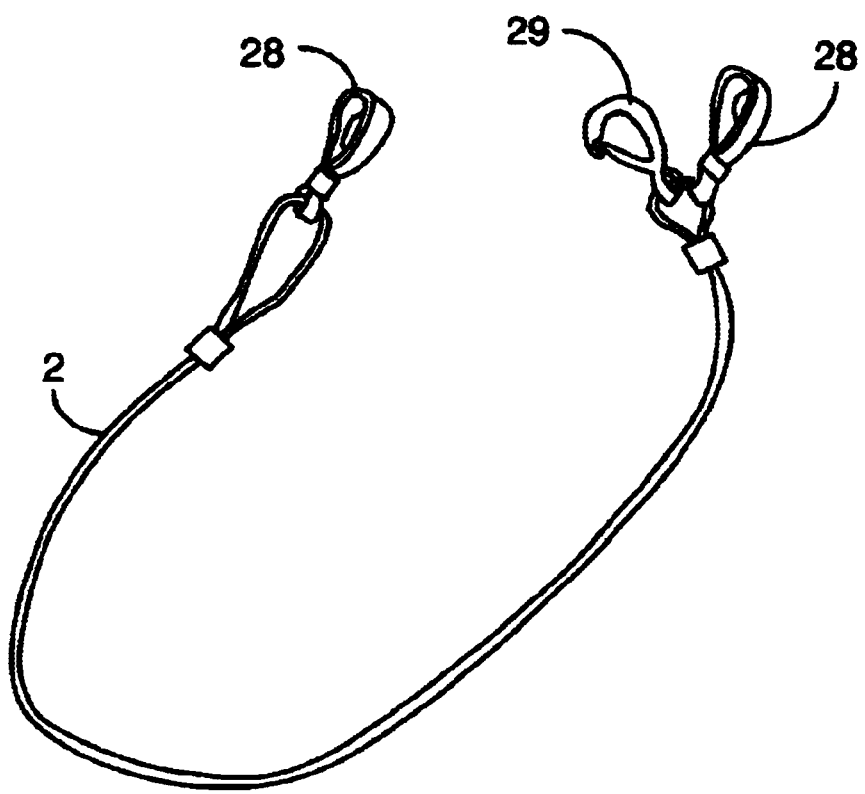
FIG. 5C illustrates another preferred embodiment of the invention that uses O-rings to secure the eyeglass retaining strap to an arm of a pair of eyeglasses.

FIG. 5C illustrates another preferred embodiment of the invention that uses O-rings 28 to secure the eyeglass retaining strap 2 to the temples of a pair of eyeglasses 7. When the O-rings 28 are attached to the temples of the eyeglasses 7, the eyeglasses can be suspended in the open configuration. Likewise, hook 29 can be used to secure the ends of the retaining strap 2 together such that the device can be worn as a necklace. In this configuration, a loop retainer 10 would be used to secure a pair of eyeglasses 7 to the device in the closed position.

Figure 6:
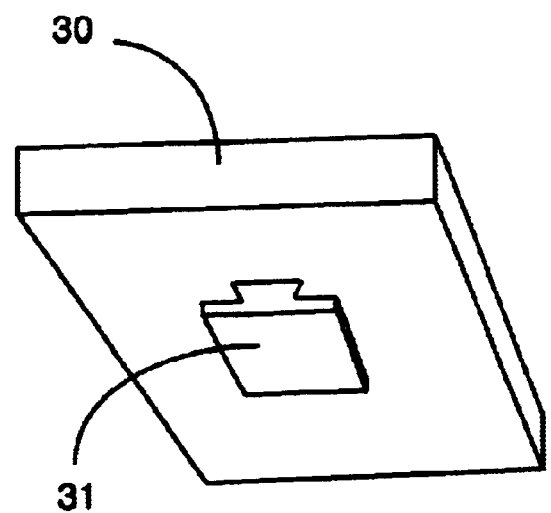
FIG. 6 illustrates a preferred embodiment of the invention that uses a float to ensure that the eyeglass retaining device will float to the surface if it falls off in water.
Figure 6:
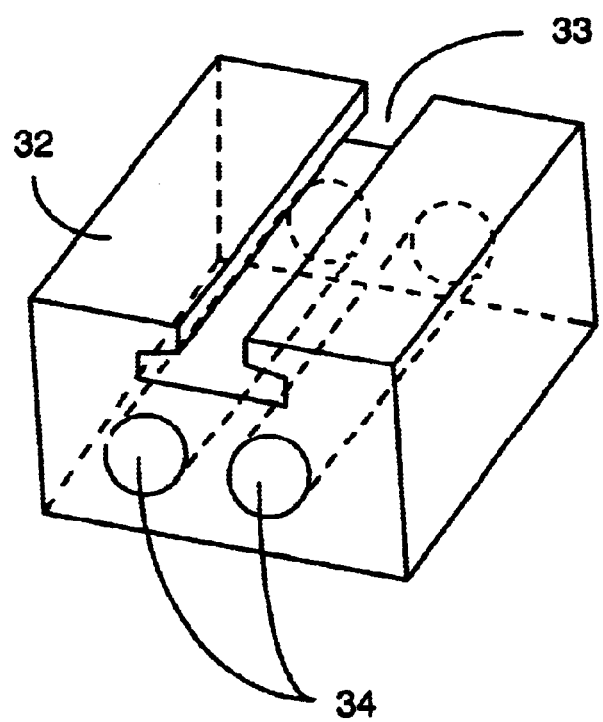

FIG. 6 illustrates a preferred embodiment of the invention that uses a float 30 to ensure that if the eyeglass retaining device 32 falls off in water, it will float to the surface. This embodiment attaches to float 30 to the retaining device 32 via a slidable locking key 31 which is held via a pressure fit. In this embodiment, the float 30 should have sufficient buoyancy to hold the device on the surface if it falls off the wearer. Preferably, the entire device, including the retaining strap 2, should be buoyant. Those skilled in the art will recognize that if the entire device is constructed of buoyant to material, then the float 30 will not be necessary.

As can be seen, the various embodiments of the invention allows eyeglass wearers to carry eyeglasses 7 in either an open or a closed position at their discretion. As a result, the device provides the convenience of changing how the eyeglasses 7 are carried to suit the particular activity of the wearer.

While the invention has been described with respect to a preferred embodiment thereof, it will be understood by those skilled in the art that various changes in detail may be made therein without departing from the spirit, scope, and teaching of the invention. For example, the material used to construct the retainer may be anything suitable for their purpose, the size and shape of the connectors can vary. Accordingly, the invention herein disclosed is to be limited only as specified in the following claims.

I claim:

1. An eyeglass retainer, further comprising:
   a retaining strap having a first and second end;
   the first and second ends of the retaining straps having a first and second retaining device, respectively, each retaining device further comprising:
      means to independently secure itself to a temple on an arm of an eyeglass, such that when both retaining devices are attached to the eyeglass arms, the retaining strap forms a loop that extends from one arm of the eyeglass to the other arm of the eyeglass such that the eyeglasses can be secured in an open configuration; and
      means to secure the first retaining device to the second retaining device such that the retaining strap forms a closed loop, and at least one of the retaining devices having means to secure a temple of the eyeglass such that the eyeglasses can be secured to the close loop in a closed configuration;
   whereby the eyeglasses can be held in an open configuration or in a closed configuration.

2. A retaining device, as in claim 1, wherein the material used to fabricate the retaining device is buoyant.

3. An eyeglass retainer, as in claim 1, further comprising:
   the retaining device having first and second apertures, each aperture sized to accept the retaining strap;
   the first and second ends of the retaining strap each having a conical tip, the conical tip having a diameter wider than the diameter of the first and second aperture is such that the end of the retaining strap is prevented from sliding through the apertures;
   the retaining strap inserted into the first aperture of the retaining device such that the conical tip prevents the end of the retaining strap from slipping through the first aperture, and the retaining strap further inserted into the second aperture of their retaining device such that retaining strap forms a loop between the first and second apertures of obtaining device; and
   the first and second aperture is further size such that the retaining strap is snugly and slidably secured such that by pulling on the retaining strap, the loop can be enlarged or decreased in size to secure it to an arm of an eyeglass.

4. A retaining device, as in claim 3, wherein the material used to fabricate the retaining device is buoyant.

5. An eyeglass retainer, as in claim 1, further comprising:
   the first retaining device having a male fitting, and the second retaining device having a female fitting, the male and female fittings cooperating, when engaged, to secure the first and second retaining devices together such that the retaining devices secure the ends of the retaining strap together such that a loop is formed by the retaining strap;

the first and second retaining devices each having a temple aperture sized to snugly and slidably attach to the temple on an eyeglass arm; and the temple apertures on the first and second retaining devices positioned such that when the retaining devices are disengaged from one another, each retaining device can be secured to the temple of an eyeglass arm and the eyeglass arm can be secured in the open position, and further positioned such that when the retaining devices are engaged, at least one of the temple apertures is accessible for attachment to the temple of an eyeglass arm;

whereby the retaining strap can extend from one temple of an eyeglass to another to secure the eyeglass in the open position, or the retaining strap can form a closed loop with a temple aperture to allow attachment of an eyeglass temple to the loop formed by the eyeglass retainer.

6. A retaining device, as in claim 5, wherein the material used to fabricate the retaining device is buoyant.

7. An eyeglass retainer, as in claim 1, further comprising:

each retaining device having a male extension and a female aperture, the male extension and the female aperture sized to snugly and slidably engage with the respective female aperture and male extension of the other retaining device, such that when engaged, the first and second retaining devices secure the ends of the retaining strap together to form a loop;

the female apertures on the first and second retaining devices sized to snugly and slidably attach to a temple on an eyeglass arm; and the male extensions and female apertures on the first and second retaining devices positioned such that when a male extension on the first retaining device is engaged with the female aperture on the second retaining device, the female aperture on the first retaining device is accessible to the temple of an eyeglass arm, such that the temple of an eyeglass arm can be inserted into it;

whereby the retaining strap can extend from one temple of an eyeglass to another to secure the eyeglass in the open position, or the retaining strap can form a closed loop with a temple aperture to allow attachment of an eyeglass temple to the loop formed by the eyeglass retainer.

8. A retaining device, as in claim 7, wherein the material used to fabricate the retaining device is buoyant.

9. An eyeglass retainer, as in claim 1, further comprising:

each retaining device having a female aperture, the female aperture sized to snugly and slidably engage with a temple on an eyeglass arm, such that when engaged, the first and second retaining devices secure the ends of the eyeglass arms to the retaining strap to secure the eyeglasses in the open position;

at least one storage slot on the first retaining device or the second retaining device;

at least one male connector, slidably and snugly stored within the storage slot, and further size such that when each end of the male connector is inserted into the female apertures, the female apertures are secured to the male connector and are retaining strap forms a loop;

the storage slot further sized such that when the retaining devices are secured together by the male connector, a temple on an eyeglass arm can be snugly and securely attached to the storage slot such that the eyeglasses can be secured in the closed position; and whereby the retaining strap can extend from one temple of an eyeglass to another to secure the eyeglass in the open position, or the retaining strap can form a closed loop with a temple aperture to allow attachment of an eyeglass temple to the loop formed by the eyeglass retainer.

10. A retaining device, as in claim 9, wherein the material used to fabricate the retaining device is buoyant.

* * * * *